US 6,638,057 B2

(12) United States Patent
Watson et al.

(10) Patent No.: US 6,638,057 B2
(45) Date of Patent: Oct. 28, 2003

(54) PARTIAL OXIDATION OF HYDROGEN SULPHIDE (75) Inventors: Richard William Watson, Addingham (GB); Stephen Rhys Graville, Sheffield (GB); Jason Scott Norman, Sheffield (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 10/168,580

(22) PCT Filed: Dec. 20, 2000

(86) PCT No.: PCT/GB00/04914
§ 371 (c)(1),
(2), (4) Date: Nov. 4, 2002

(87) PCT Pub. No.: WO01/48423
PCT Pub. Date: Jul. 5, 2001

(65) Prior Publication Data
US 2003/0108839 A1 Jun. 12, 2003

(30) Foreign Application Priority Data
Dec. 23, 1999 (GB) .............................. 9930562

(51) Int. Cl.[7] .............................. F23C 5/00; F23C 5/06; F23C 7/00
(52) U.S. Cl. ...................... 431/174; 431/178; 431/186; 431/187
(58) Field of Search ............................... 431/174, 178, 431/187, 186, 8

(56) References Cited

U.S. PATENT DOCUMENTS

| 2,095,065 | A | * | 10/1937 | Hays ............................. 431/7 |
| 4,933,163 | A | * | 6/1990 | Fischer et al. ........... 423/574.1 |
| 5,112,219 | A | * | 5/1992 | Hiemstra ..................... 431/354 |
| 5,803,725 | A | * | 9/1998 | Horn et al. .................. 431/187 |

FOREIGN PATENT DOCUMENTS

| DE | 879089 | * | 6/1953 |
| EP | 0198332 | * | 4/1986 |
| EP | 0486285 | * | 5/1992 |
| EP | 0974552 | * | 6/1999 |
| FR | 9801556 | * | 8/1999 |
| GB | 1074826 | * | 7/1967 |
| JP | 58182005 | * | 10/1983 |

* cited by examiner

Primary Examiner—Alfred Basichas
(74) Attorney, Agent, or Firm—Philip H. Von Neida (57) ABSTRACT An air-oxygen hydrogen sulphide burner (108) fires into a furnace (102). The burner comprises a main passage for combustion-supporting gas containing air (112), a multiplicity of spaced apart outer elongate fluid-conducting open ended tubes extending in parallel with each other along the main passage, each of the outlet tubes surrounding at least at the distal end of the burner a respective inner elongate fluid-conducting open ended tube, the inner tubes extending in parallel with one another, a first inlet to the burner for oxygen or oxygen-enriched air, and a second inlet to the burner for feed gas containing hydrogen sulphide, the first inlet communicating with the inner tubs, and the second inlets communicating with the outer tubes.

13 Claims, 6 Drawing Sheets

PARTIAL OXIDATION OF HYDROGEN SULPHIDE

This invention relates to a method of and apparatus for the partial oxidation of hydrogen sulphide and to burners for use in the method and apparatus.

So-called acid gas streams containing hydrogen sulphide and carbon dioxide are formed as waste streams in, for example, oil and gas refineries. It is necessary to treat an acid gas stream so as to remove substantially all its content of hydrogen sulphide before it is discharged to the atmosphere. This removal of hydrogen sulphide is conventially performed by the Claus process, in which a part of the hydrogen sulphide content is burned in a furnace to form sulphur dioxide and water vapour; some of the resultant sulphur dioxide reacts in the furnace with residual hydrogen sulphide to form sulphur vapour and water vapour (with the result therefore that some of the hydrogen sulphide is partially oxidised). An effluent gas stream comprising hydrogen sulphide, sulphur dioxide, carbon dioxide, water vapour, and sulphur vapour therefore flows out of the furnace. The sulphur vapour is extracted from the gas mixture by condensation, and the resulting gas mixture substantially free of sulphur vapour is subjected to a plurality of catalytic stages of further reaction between sulphur dioxide and hydrogen sulphide so as to form sulphur vapour. The further sulphur vapour is extracted from the gas mixture downstream of each stage of catalytic reaction. A tail gas containing typically from 2 to 6% of the original sulphur content of the acid gases thereby formed. The tail gas is typically sent for further treatment to remove substantially all the remaining sulphur compounds.

Traditionally, air is employed to support the combustion of the hydrogen sulphide. Typically the air is supplied at a rate sufficient to provide enough oxygen molecules to oxidise completely any ammonia present to nitrogen and water vapour and to oxidise completely any hydrocarbons present to carbon dioxide and water vapour and to effect oxidation to sulphur dioxide and water vapour of about one third of the hydrogen sulphide content of the acid gas. It has more recently been recognised that improvements in the Claus process can be achieved by substituting commercially pure oxygen for some of the air. As a result, the size of the furnace and downstream units can be reduced for a given throughput of hydrogen sulphide.

EP-A-0 486 285 relates to an oxygen-air-hydrogen sulphide burner, for use in the Claus process. The burner comprises a hollow body member having an open distal end and defining a passage through which extends a plurality of first elongate, open-ended, tubular members able to conduct fluid and a plurality of second, elongate, open-ended tubular members also able to conduct fluid, each second tubular member being located within a respective first tubular member. The first tubular members communicate with a source of hydrogen sulphide and the second tubular members with a source of oxygen. The purpose of providing each oxygen tube within a respective hydrogen sulphide tube is to make possible the achievement of particularly good mixing of the oxygen and the fuel and to obtain uniform conditions within the flame. In addition, stable operating conditions can be obtained at relatively low fuel and oxygen velocities.

Although the burner according to EP-A-0 486 285 performs well in practice, we believe that in the Claus process a higher percentage conversion of hydrogen sulphide to sulphur in the gas mixture leaving the sulphur condenser associated with the furnace can be achieved if, in fact, a suitable non-uniform flame is provided. Accordingly it is an aim of the present invention to provide a method of and apparatus for the partial oxidation of hydrogen sulphide in which the burner has a construction which facilitates the attainment of relatively high percentage conversions of hydrogen sulphide to sulphur in the furnace.

According to the present invention there is provided apparatus for the partial oxidation of hydrogen sulphide comprising a furnace and an air-oxygen-hydrogen sulphide burner that fires into the furnace, wherein the burner comprises a main passage for combustion-supporting gas containing air, a multiplicity of spaced apart outer elongate fluid-conducting open-ended tubes extending in parallel with each other along the main passage, each of the outer tubes surrounding at least at the distal end of the burner a respective inner elongate fluid-conducting open-ended tube, the inner tubes extending in parallel with one another, a first inlet to the burner for oxygen or oxygen-enriched air, and at least one second inlet to the burner for feed gas containing hydrogen sulphide, the first inlet communicating with the inner tubes, and the second inlet communicating with the outer tubes, wherein the outlets of the inner and outer tubes are so disposed that, in operation, essentially all mixing of hydrogen sulphide with oxygen and air takes place downstream of the distal end of the burner, and wherein the outlets of the inner and outer tubes are so juxtaposed and dimensioned as to enable there to be maintained in the furnace, in operation, a stable flame with at least one high temperature first stage, and at least one second lower temperature stage, the first stage being more remote than the second stage from a chosen area of the inner wall or walls of the furnace, the chosen area thereby being shielded from the first stage by the second stage, and the said tubes are arranged in two groups, there being a first group of inner and outer tubes which in operation feed the first stage of the flame, and a second group of inner and outer tubes which in operation feed the second stage of the flame, the inner tubes in the internal first group being of greater internal diameter than the inner tubes in the second group.

As a result of its being relatively oxygen-rich, an average flame temperature in the range of 1700 to 2300° C. can be achieved in the inner stage of the flame. Such high temperatures are believed to favour cracking, i.e. thermal dissociation, of the hydrogen sulphide into hydrogen and sulphur. As a result, it is believed that a higher proportion of the hydrogen sulphide is converted to sulphur than at lower temperatures. In addition, having a high temperature oxygen-rich first stage also facilitates the complete destruction of any ammonia in the feed gas not only because of the high temperature of the first stage but also because the second stage although relatively oxygen poor can still be operated at temperatures in excess of 1400° C. It is highly desirable to effect such complete removal of ammonia since if any of this gas passes from the furnace to any catalytic stages of a Claus process it can form ammonia salts which poison the catalyst or block other units operating at lower temperatures.

Preferably the outlets of the outer tubes in the first group are spaced wider apart than the outlets of the outer tubes in the second group. As a result, proportionately more air tends to be made available to the first group of tubes than to the second group of tubes, thereby facilitating the achievement of the desired oxygen-rich conditions in the first stage of the burner. This result is particularly facilitated if there are more tubes in the second group than the first group; typically there are at least twice as many tubes in the second group than in the first.

Preferably the tubes in the first group may have an internal diameter typically from 1.3 to 3 times the internal diameter of such tubes in the second group. Such an arrangement facilitates in operation the sending of proportionately more oxygen or oxygen-enriched air to the first stage of the flame than to the second stage, thereby particularly helping to achieve a high temperature in the first stage. In such an arrangement, it is convenient that the internal diameter of the tubes in the first group that communicate with the second inlet are of the same internal diameter as the tubes in the second group that communicate with the second inlet.

There are generally two different ways in which the burner can be disposed. In one, the burner fires generally along the longitudinal axis of the furnace. If such an axial disposition of the burner is adopted, the second group of inner and outer tubes typically surrounds all the tubes in the first group. As a result, the flame comprises an inner high temperature core, the first stage, and an outer lower temperature envelope, the second stage. More complex arrangements are possible. For example, the outlets of the tubes can be grouped so that there is one or more intermediate stage between the inner core and the outer envelope. Such an intermediate stage can either be a relatively oxygen-enriched stage, i.e. a second high temperature stage, or, more preferably, an oxygen-poor stage, i.e. a second lower temperature stage.

Alternatively, the burner can have a generally tangential position relatively to the exterior of the furnace. In a tangential position, with a horizontal furnace, there is a greater tendency for thermal damage to be done at the bottom of the furnace than at the top. Such a tendency can be counteracted by having the outlets of the first group of inner and outer tubes positioned generally above the outlets of the second group.

The feed gas is typically a mixture of hydrogen sulphide and carbon dioxide. Water vapour, hydrocarbons and/or ammonia may also be present. It desired, the feed gas may be amine gas from an oil refinery or a mixture of an amine gas with a sour water stripper gas. Amine gas typically comprises at least 70% by volume of ammonia and additionally contains at least 10% of carbon dioxide. Sour water stripper gas is a mixture of hydrogen sulphide, ammonia and water vapour. Other gases may also be present in the sour water stripper gas. If it is desired to treat both gases by the method and in the apparatus according to the invention, they can be pre-mixed. One potential disadvantage of such pre-mixing, however, is that some of the ammonia will tend to flow to the lower temperature stage or stages of the flame and a risk may arise that not all the ammonia will be destroyed. In practice, however, with oxygen operation the lower temperature stage or stages may typically be maintained of a temperature above the minimum for ammonia destruction. In any even, the potential disadvantage can be avoided if the burner is so arranged that there are two second inlets, one being associated exclusively with the first group or tubes, and the other being associated exclusively with the second group of tubes. In this Away, if the ammonia-containing gas (the sour water stripper gas) can all be directed into the high temperature oxygen-rich stage or stages of the flame. Such an arrangement can make it easier to achieve total removal of the ammonia from the feed gas.

Depending on its size, the burner according to the invention may have from 6 to 30 first tubes. Preferably, it has from 8 to 20 first tubes.

Preferably, the inner and outer tubes all terminate in an common plane normal to the axis of the burner. Such an arrangement helps to reduce thermal erosion of the burner. If desired, each of the tubes can be given a tip of heat and corrosion resistant alloy, but this is generally not necessary. Indeed, the burner can continue to operate effectively even with erosion of the tubes.

The main passage of the burner is conveniently defined by a port through which the burner fires into the furnace. Alternatively, the burner may have an outer shell which defines the passageway which is separate from the furnace.

There is generally no need for any special cooling system for the burner. This is because the burner can be readily arranged such that, in operation, flow of the combustion supporting gas containing air is sufficient to provide adequate cooling for the burner.

A burner according to the invention also offers same advantages in mechanical construction as that according to EP-A-0 486 285. Thus, the burner tubes may be fabricated from relatively inexpensive materials, for example, stainless steel. Secondly, fabrication is particularly simple because, there being no end plate, no need to drill oblique orifices arises. Third, the burner is able to cope with sources caused by thermal expansion and contraction since the inner and outer tubular members are typically only secured only at their proximal ends and have three distal ends.

By appropriate distribution of combustion supporting and hydrogen sulphide containing gases between the different stages of the flame, it is possible to ensure that the mole ratio of hydrogen sulphide to sulphur dioxide in the effluent gas from the furnace is in the order of 2 to 1 and therefore able to meet the requirements of a conventional Claus process employing catalytic Claus reaction units as well as the furnace. Further, sufficiently low temperatures can be maintained in the shielding or second stage or stages of the flame so as to avoid any risk of damage to the refractory lining which is typically employed to protect the inner walls of the furnace without compromising ammonia destruction if that gas is present. Moreover, there is considerably flexibility in selecting the stoichiometry of the different stages of the flame. Indeed, it is generally preferable to operate the first stage or stages such that they receive oxygen molecules at a rate in the range of $(110x/300+y+z)$ to $(240x/300+y+z) m^3 s^{-1}$ where:

x is the stoichiometric flow rate of oxygen molecules required for complete oxidation of the hydrogen sulphide entering the first stage:

y is the stoichiometric flow rate of oxygen molecules required for complete oxidation of any ammonia entering the first stage:

z is the stoichiometric flow rate of oxygen molecules required for complete oxidation of any hydrocarbons entering the first stage above.

The temperature of the effluent gas leaving the outlet of the furnace can readily be kept below 1650° C.

Another advantage of the method according to the invention is that it has the ability to cater for quite widely varying flows of the feed gas containing hydrogen sulphide. At lower rates of supply of the feed gas, the mole fraction in the oxygen or oxygen-enriched air which is supplied to the first stage or stages of the flame can be reduced. Indeed, at the lowest rates of supply of the feed gas, air can be substituted for the oxygen or oxygen-enriched air supplied to the first stage or stages of the flame. Provided that such a substitution does not prejudice the complete destruction of ammonia, particularly in the second stage or stages. Examples of burners which enable all the ammonia to be fed to the first stage or stages are therefore preferred when good turndown characteristics are required.

The invention also provides a burner for use in the method and apparatus according to the invention.

The method and apparatus according to the invention will now be described by way of example with reference to the accompanying drawings, in which.

The drawings are not to scale.

Figure 2:
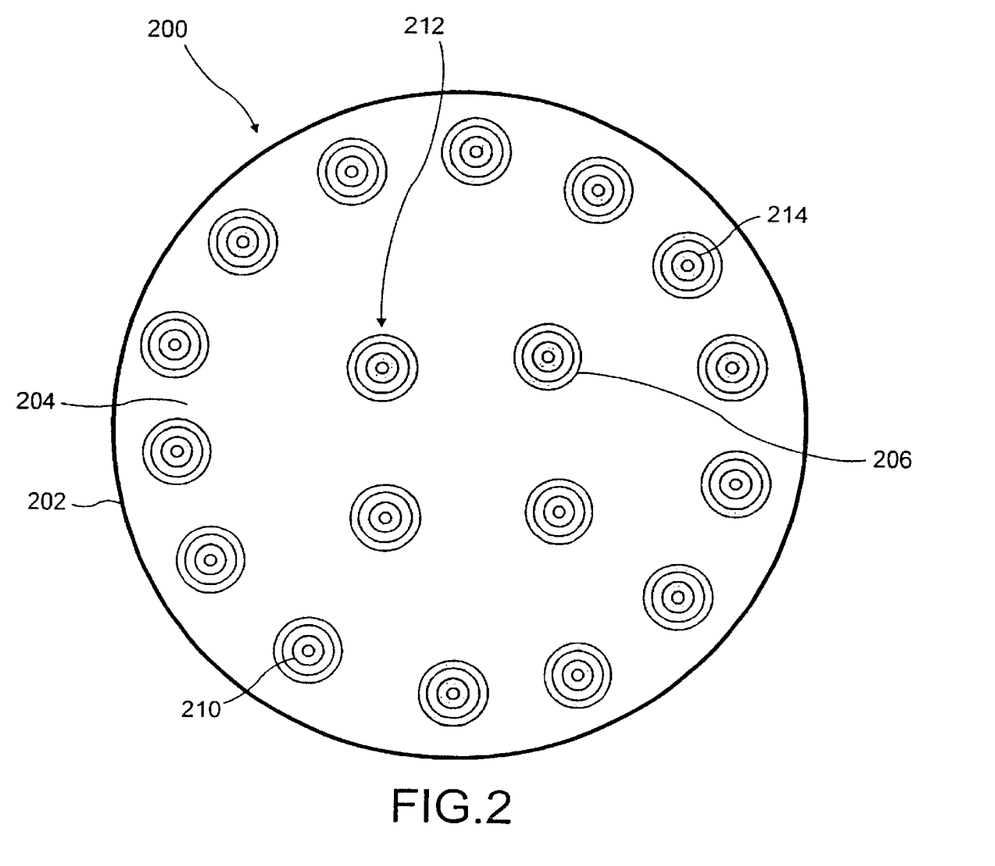
FIG. 2 is a schematic view from its distal end of one burner for use in the apparatus shown in FIG. 1.
Figure 8:
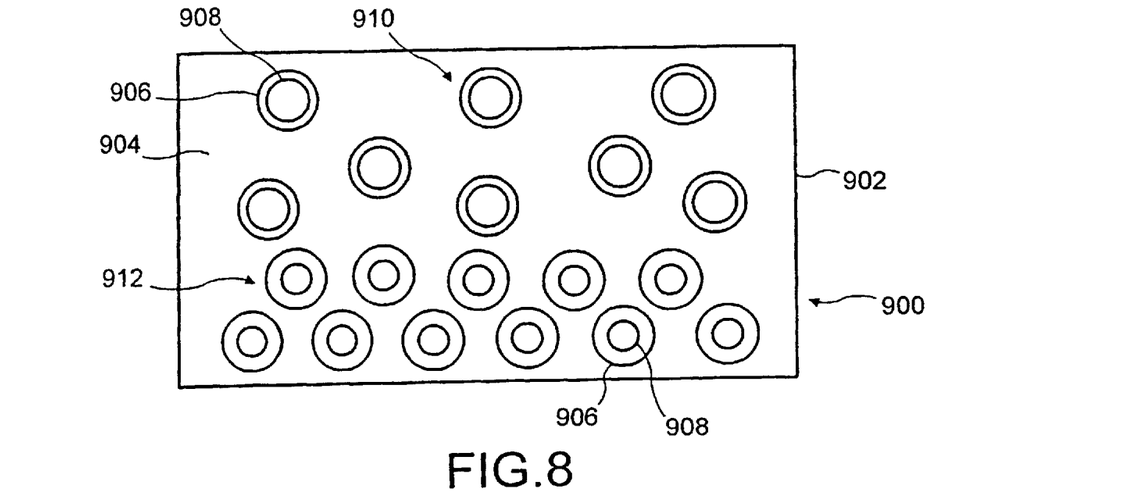
FIG. 8 is a schematic end view from its distal end of a second burner for use in the apparatus shown in FIG. 7.

The burners according to FIG. 2 and FIG. 8 are not in accordance with the invention but are described so as to facilitate understanding of the invention.

Figure 1:
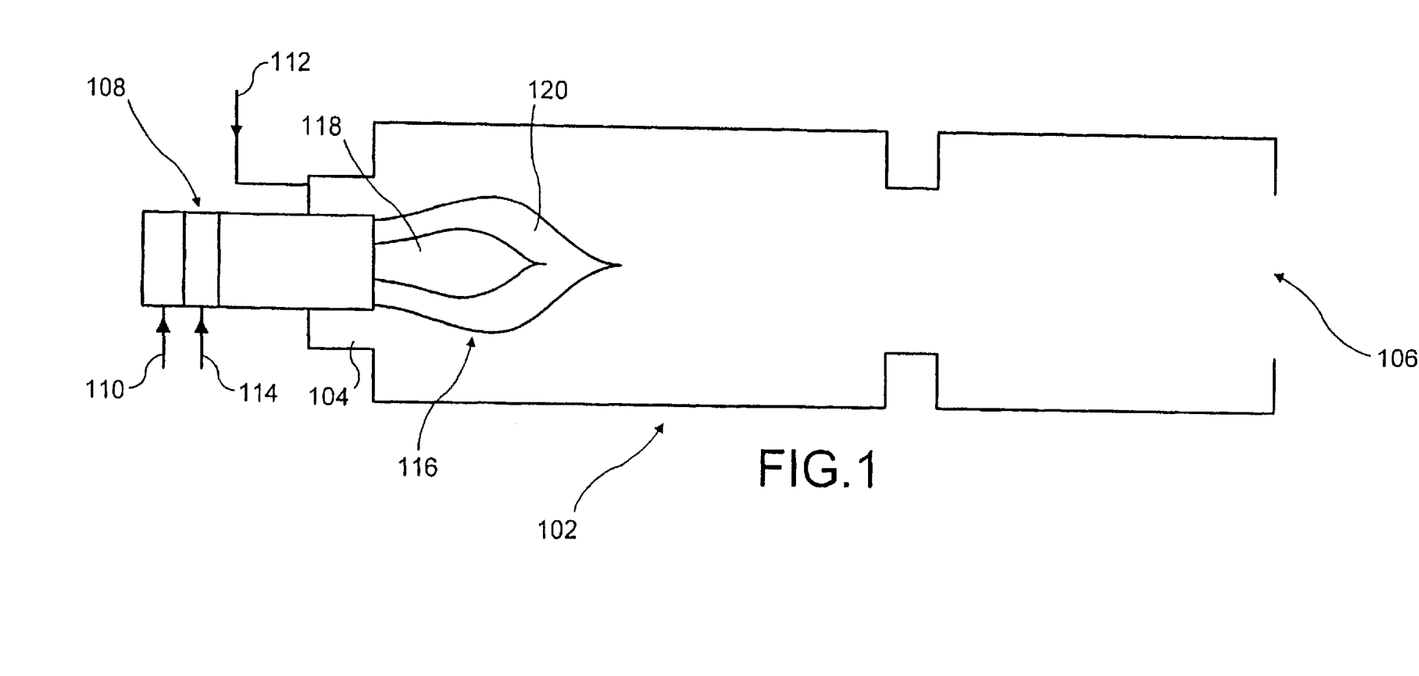
FIG. 1 is a schematic side view, partly in section, of an apparatus according to the invention in which the burner is axially located.

Referring to FIG. 1 of the drawings, a furnace 102 for the partial oxidation of hydrogen sulphide has an axial inlet port 104 at one end and axial outlet port 106 at its opposite end. The inlet port 104 receives a burner 108. The distal end 110 of the burner 108 is slightly withdrawn into the port 104. The burner 108 is of a shell-and-tube structure. If desired, the inner wall of the port 106 can form the shell of the burner 108. The burner 108 is operatively associated with pipelines 110, 112 and 114 for the supply, respectively, of oxygen, air and a gas stream containing hydrogen sulphide. If desired, although not shown in FIG. 1, there may be two separate pipelines 114 for the supply to the different parts of the burner 108 of different hydrogen sulphide containing gas streams.

In operation, the burner 108 fires into the furnace 102. A flame 116 is produced. The flame 116 has a relatively hot oxygen-rich inner region or stage 118 and a lower temperature outer region or stage 120 surrounding the inner stage 118. Temperatures within the high temperature inner stage 118 can exceed 2000° C. Typically, oxygen molecules enter the stage 118 at a rate in the range of $(120x/300+y+z)$ to $(240x/300+y+z) m^3 s^{-1}$ where x, y and z all have the meanings signed to them above.

Several chemical reactions take place in the furnace 2. Firstly there are combustion reactions in which any hydrocarbon present in the hydrogen sulphide containing gas is completely oxidised to carbon dioxide and water vapour and any ammonia present in the hydrogen sulphide containing gas is completely oxidised to nitrogen and water vapour. The main combustion reaction is, however, the burning of hydrogen sulphide to form water vapour and sulphur dioxide. Part of the resultant sulphur dioxide reacts with residual hydrogen sulphide to form sulphur vapour and water vapour. Another important reaction which takes place in the flame zone 116 of the furnace 102 is the thermal dissociation of the part of the hydrogen sulphide in to hydrogen and sulphur vapour. This reaction is favoured by high temperatures. In addition, some of the ammonia also dissociates thermally into nitrogen and hydrogen. Minor reactions may also take place in the furnace 102.

The burner 108 typically has from 8 to 20 outer tubes (not shown) and 8 to 20 inner tubes (not shown). One arrangement of the tubes and the outer shell shown in FIG. 2. Referring now to FIG. 2 a burner 200 has an outer shell 202. The shell 202 defines a main passage 204 for the flow of air. The air is preferably neither enriched in nor depleted of oxygen but is instead normal atmospheric air. There are 18 open-ended outer tubes 208 that extend along the main passage 204. The outer tubes 208 are all parallel to one another and to the longitudinal axis of the shell 202. Each outer tube 208 surrounds, at least at its distal end, an inner tube 210. Each inner tube 210 is coaxial with the outer tube 208 in which it is received. The distal ends of the tubes 208 and 210 all terminate in the same plane normal to the longitudinal axis of the burner 200. There is therefore no mixing of hydrogen sulphide with air or oxygen upstream of the distal end of the burner. The inner tubes 210 all communicate with a source of oxygen or oxygen-enriched air. Preferably, the oxygen is at least 80% pure, more preferably at least 90%, and most preferably at least 99% pure. The outer tubes 208 all communicate with a source of gas containing hydrogen sulphide. This gas may also contain ammonia and hydrocarbons as well as non-combustible components such as water vapour, nitrogen, carbon dioxide and argon.

The pairs of outer tubes 208 and inner tubes 210 are arranged in a first, inner, group 212 and a second, outer group 214. The outer group of pairs of tubes 208 and 210 are arranged such that their outlets all lie on the circumference of a notional circle. As shown in FIG. 2 there are 14 pairs of tubes 208 in the second group 214. The outer tubes 208 in the second group 214 are equally circumferentially spaced from one another. There are on the other hand only four pairs of outer tubes 208 and inner tubes 210 in the first group 212. Each pair of tubes 208 and 210 in the group 212 can be viewed as lying at a corner of a notional square, through the centre of which square the longitudinal axis of the burner extends. As shown in FIG. 2, the spacing between the individual pairs of tubes in the inner group 212 is greater than the spacing between the individual pairs of tubes in the outer group 214. Since all the outer tubes 208 are of the same diameter as one another, as are all the inner tubes 210, it can be readily appreciated that the hydrogen sulphide containing gas leaving the outlets of the tubes 208 in the inner group 212 comes into contact with proportionately more oxygen molecules than the hydrogen sulphide leaving the tubes 208 forming part of the outer group 214. As a result, a flame having an inner oxygen-enriched high temperature stage and an outer lower temperature stage can be maintained. Because the first group 212 of outlets is surrounded by the second group 214, the high temperature stage is surrounded by the lower temperature stage and, therefore, it is a simple matter to manipulate the relative flows of gases to the burner 200 such that the second or outer stage of the flame effectively shields the entire refractory lined inner surface of the furnace from the high temperature inner stage of the flame. Further, the flows can be arranged so as to achieve the necessary rate of supply of oxygen molecules to the first stage of the flame and thereby achieve an average temperature, typically above 1700° C., in the first stage, which promotes thermal cracking or dissociation of hydrogen sulphide, while keeping the average temperature of the second stage typically below 1650° C. so as to avoid damage to the refractory walls of the furnace into which the burner 200 fires.

The burner shown in FIG. 2 achieves its staging by a disproportionately large distribution of air to the first group 212 of tubes. The degree of staging that can be achieved by this means is, however, limited. Another consequence of the manner in which the tubes are grouped together in the burner shown in FIG. 2, is that the staging of the burner tends to become more pronounced the lower the purity of the oxygen flowing through the inner tubes 210. This is because the lower the purity of this oxygen, the greater needs to be the flow of air through the main passage 204 and therefore the more pronounced the effect of the disproportionate distribution of the air between the first and second groups of tubes.

Figure 3:
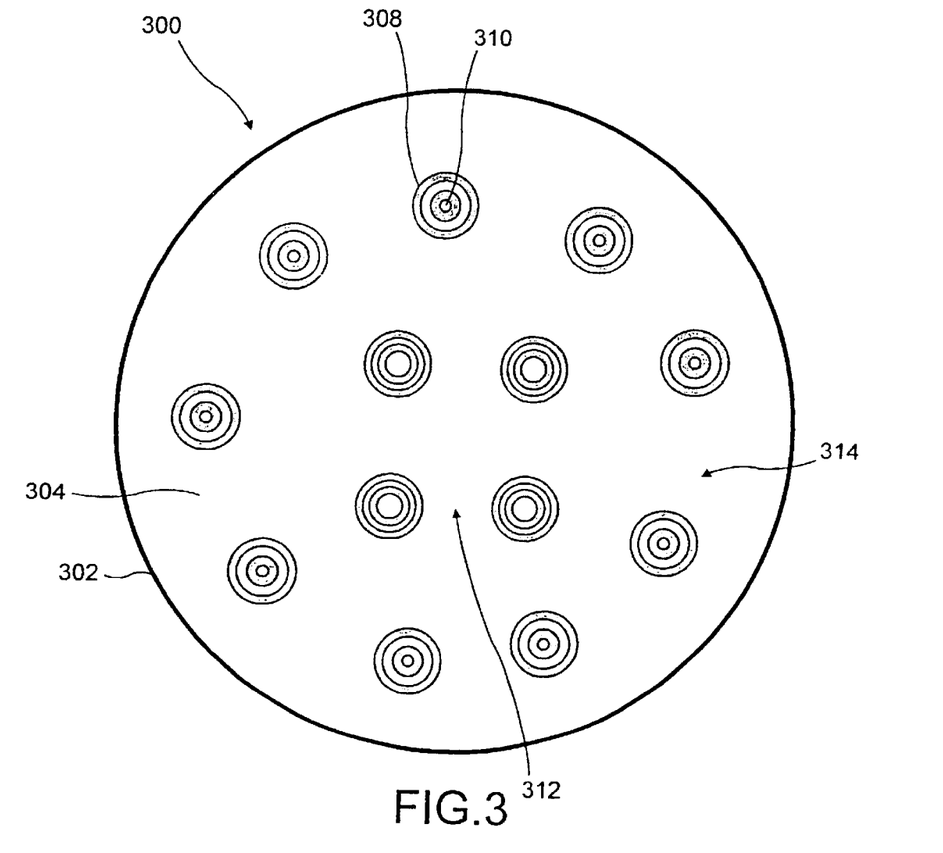
FIG. 3 is a schematic view from its distal end of an alternative burner for use in the method and apparatus shown in FIG. 1.

Referring now to FIG. 3, the burner 300 shown therein has many similarities with the burner 200 shown in FIG. 2. Thus, the burner 300 has an outer shell 302 defining a main passage 304 for the flow of air. There are thirteen open-ended outer tubes 308 extending along the passage 304 parallel to one another and to the axis of the burner 300. All the tubes 308 are of the same diameter to one another. Each tube 308 surrounds at least at its distal end a respective open-ended coaxial inner tube 310. The outlets of the pairs of tubes 308 and 310 are arranged in two groups analogously to the pairs of tubes in the burner 200. Thus, there is an inner group 312 of four pairs of outlets arranged in the manner of the group 212 of the burner 200 and an outer circumferentially disposed group 314 of pairs of tube outlets. However, there are only nine pairs of tubes outlets in the group 314. Further, the spacing between adjacent outlets of the outer tubes 308 in the outer group 314 is the same as the spacing between adjacent outlets of tubes 308 in the inner group 312. Accordingly, the air that flows through the passage 304 is approximately equally distributed to the individual flows of hydrogen sulphide containing gas leaving the outlets of the tubes 308, be they in the first group 312 or the second group 314.

The diameters of the tubes 310 are not all equal Those tubes 310 whose outlets form the first group 312 are of greater internal diameter than the tubes 308 whose outlets lie in the second group 314. Typically, the internal diameter of the larger diameter ones of the tubes 310 is at least twice that of the internal diameter of the smaller diameter ones of the tubes 308.

In contrast to the burner shown in FIG. 2, the staging of the resultant flame becomes more pronounced the greater the purity of the oxygen supplied to the tubes 308. Further, because the burner shown in FIG. 3 relies on a disparity between the rates of supply to the respective oxygen tubes 310 of the first and second groups 312 and 314, respectively, in general, higher flame temperatures in the first or inner stage of the flame can be achieved with the burner shown in FIG. 3 than that shown in FIG. 2.

If desired, both means of achieving a high temperature inner stage and a lower temperature outer stage can be employed in the same burner. Thus, the burner shown in FIG. 2 could employ in the first group 212 of pairs of oxygen tubes 208 of larger diameter than the corresponding oxygen tubes 208 in the second or outer group 214.

Figure 4:
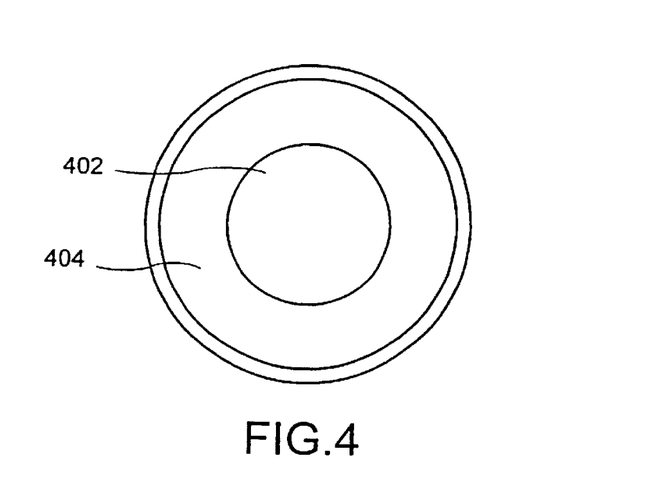
FIG. 4 is a schematic section through the furnace shown in FIG. 1 illustrating the distribution of temperature within a section through a flame produced by either the burner shown in FIG. 2 or that shown in FIG. 3.

Either the burner shown in FIG. 2 or that shown in FIG. 3 is able to produce a flame which at its maximum diameter has a cross-section generally as shown in FIG. 4, there being a relatively high temperature central zone 402 and a lower temperature outer annular zone 404. The flame occupies most of the cross-section of the furnace so as to maintain maximum utilisation of the available space therein.

Figure 5:
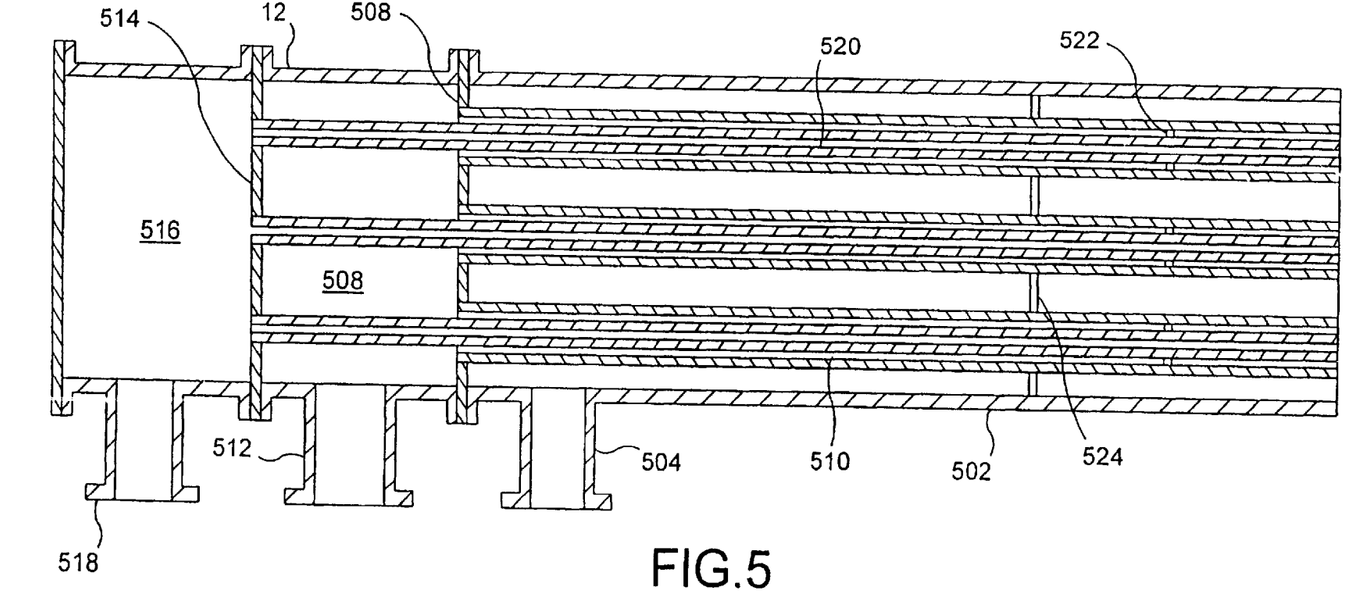
FIG. 5 is a schematic sectional side view of a burner for use in the method and apparatus according to the invention illustrating the ducting of the gas flow to the respective tubes and passages of the burner.

The construction of burners of the kind shown in FIGS. 2 and 3 is illustrated in FIG. 5. For ease of illustration, only three pairs of inner and outer tubes are shown in FIG. 5. The burner shown in FIG. 5 has an elongate tubular shell 502 which is open at its distal end and which has at its proximal end an inlet 504 able to be connected to a supply of compressed air (not shown). The shell 502 is secured fluid-tight to a back plate 506. The back plate 506 forms one wall of a first generally cylindrical gas distribution chamber 508, the back plate 506 is formed with apertures in which the proximal ends of open-ended outer tubes 510, which are parallel to one another and to the longitudinal axis of the shell, are engaged fluid-tight. Gases therefore able to flow from the gas distribution chamber 508 through the tubes 510 from their proximal to their distal ends. The gas distribution chamber 508 has an inlet 512 for hydrogen sulphide containing gas. Thus, the outer tubes 508 receive the hydrogen sulphide containing gas in operation of the burner. The chamber 508 is provided with another plate 514 opposite the plate 508. The plate 514 forms a common wall shared by the gas distribution chamber 508 with a second gas distribution chamber 516 which has an inlet 518 able to be connected to a source of commercially pure oxygen. The plate 514 has apertures in which are engaged fluid-tight the proximal ends of open-ended inner tubes 520 which for most of their length extend through and are coaxial with the outer tubes 510. Oxygen is able to flow from the chamber 516 through the inner passages 520.

As shown in FIG. 5, the distal ends of all the inner tubes 520 and all the inner tubes 510 terminate in the same plane normal to the axis of the burner. It is to be appreciated that the inner tubes 520 are not secured to any plate or like member at their distal ends. In order to provide support for them, each inner tube 520 maybe provided with a spider 522 joined thereto making a frictional engagement with the inner surface of the respective outer tube 510. Analogously, the outer tubes 510 are provided with spiders 524 joined thereto, the ends of each spider 524 making frictional engagement with either the inner surface of the shell 502 or the outer surface of another outer tube 510.

Typically, all the parts of the burner shown in FIG. 5 are fabricated from steel, typically stainless steel. There is no communication between the first gas distribution chamber 508 and the second gas distribution chamber 516. Similarly, there is no gas communication between the gas distribution chamber 508 and the passage 502 defined by the shell 500. Accordingly, there is no pre-mixing of hydrogen sulphide with either air or oxygen.

Figure 6:
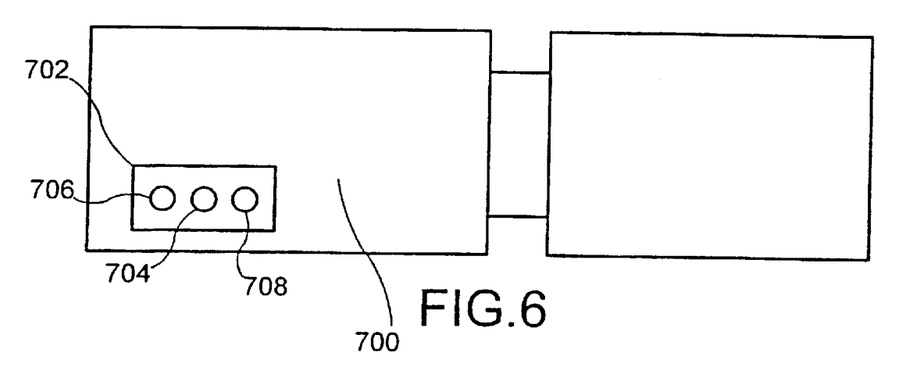
FIG. 6 is a schematic view of an apparatus in which the burner is tangentially mounted.

Referring now to FIG. 6, there is shown a furnace 700 having a burner 702 which fires generally tangentially into the furnace. The internal walls of the furnace 700 have a refractory lining. The burner 702 has inlets 704, 706 and 708 for oxygen, air and hydrogen sulphide containing gas, respectively. In general, the operation of the furnace shown in FIG. 6 is an analogous to that shown in FIG. 1. However, the flame (not shown) issuing from the burner 702 tends to have generally arcuate shape extending across the furnace 700. As a result of the flame shape the refractory lining at the bottom of the furnace tends to become hotter than that at the top. It is particularly desirable to ensure that the refractory at the bottom of the furnace 700 does not become overheated. Another feature of the arrangement shown in FIG. 6 is that the shell of the burner is of rectangular cross-section.

Figure 7:
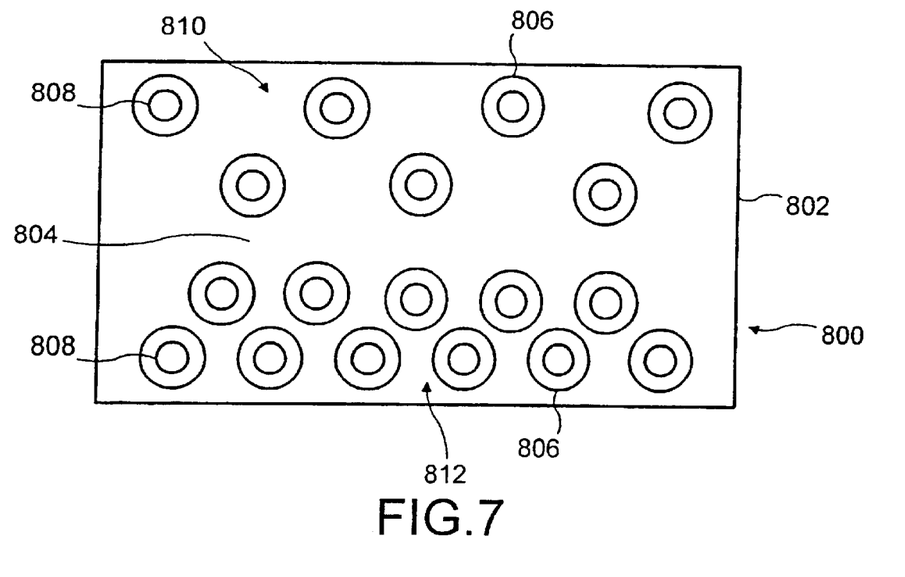
FIG. 7 is a schematic view from its distal end of a first burner suitable for use in the apparatus shown in FIG. 6.

Referring to FIG. 7, a burner 800 has an outer shell 802 of rectangular cross-section defining a main passage 804 for air. The burner 800 is intended for tangential firing into a furnace (not shown in FIG. 7) in the manner illustrated in FIG. 6. Extending within the main air passage 804 in parallel with one another are a multiplicity of open-ended outer tubes 806. Each outer tube 806 surrounds a coaxial inner tube 808 at least the distal end of the burner 800. The tubes 806 communicate at their proximal ends with a source of hydrogen sulphide containing gas; the tubes 808 communicate at their proximal ends with a source of commercially pure oxygen or oxygen-enriched air.

The pairs of tubes 806 and 808 are allocated between an upper group 810 and a lower group 812. There are eight pairs of tubes in the upper group 810 and eleven in the lower group 812. The outer tubes 806 are all of the same internal diameter as each other as are all the inner tubes 808. The outer tubes 806 in the upper group 810 are, however, more widely spaced apart than those in the lower group 812.

Figure 9:
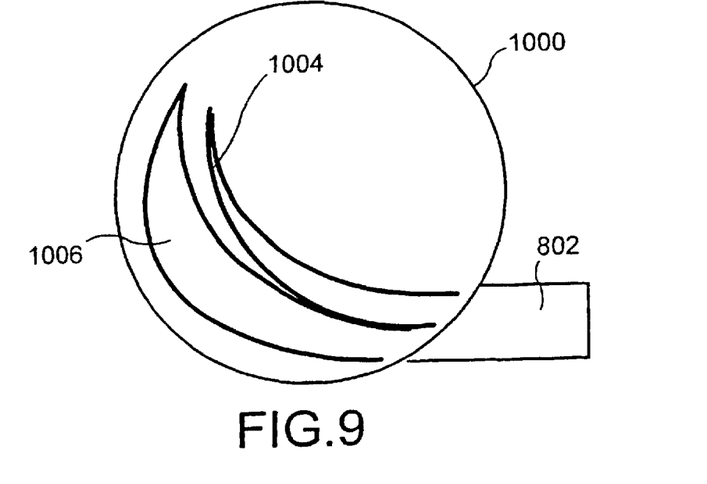
FIG. 9 is a schematic cross-sectional view of the furnace shown in FIG. 6 illustrating generally the flame shape produced by operation of the burner shown in FIG. 7 or FIG. 8.

In operation, all mixing of hydrogen sulphide with oxygen and air takes place downstream of the distal end of the burner 800. The arrangement of the outlets of the outer tubes 806 and the inner tubes 808 is such so as to enable there to be maintained in the furnace, in operation, a stable flame with a first high temperature stage which receives oxygen molecules at a rate in the range of $(120x/300+y+z)$ to $(240x/300+y+z) m^3 s^{-1}$ where x, y and z all having the meanings assigned to them above. The pairs of tubes in the lower group 812 feed oxygen or oxygen-enriched air and hydrogen sulphide containing gas to the lower temperature stage of the flame. This lower temperature stage shields the inner walls of the furnace from the relatively high temperature upper stage. A typical flame shape which can be achieved by operation of the burner 802 in the furnace shown in FIG. 6. With reference to FIG. 9, the burner 802 fires into a furnace 1000 and produces a generally arcuate flame 1002 having a high temperature inner stage 1004 typically having an average temperature in the range of 1700 to 2300° C. and a low temperature outer zone 1006 typically having an average temperature below 1650° C. which shields a chosen region of the inner wall of the furnace 1000 from the stage 1004.

Referring again to FIG. 7, the staging of the flame results from the fact that the hydrogen sulphide issuing from the outer tubes 806 in the upper group 810 is able to mix with proportionalately more air than hydrogen sulphide issuing from the outer tubes 806 in the lower group 812. As a result, the inner stage 1004 of the flame 1000 is more oxygen rich than the outer stage 1006.

Referring now to FIG. 8, there is shown a burner 900 which is generally similar to that shown in FIG. 7. Thus, the burner 900 has an outer shell 902 of rectangular of crosssection. The shell 902 defines the main passage 904 for the flow of air. There is a multiplicity of outer open-ended tubes 906 extending parallel to one another. Each outer tube 906 surrounds an inner open-ended tube 908 at least at the distal end of the burner 900. All the tubes 906 and 908 terminate at their distal end in a common plane normal to the axis of the burner 900. The pairs of tubes are located in an upper group 910 and a lower group 912. The outer tubes 906 in the lower group 912 are more closely spaced together than the outer tubes 906 in the upper group 912. As a result, the kind of flame shape shown in FIG. 10 is able to be pronounced with a hot inner zone 1004 and a lower temperature outer zone 1006. One significant difference, however, between the burner 900 shown in FIG. 9 and the burner 800 shown in FIG. 8 is that the internal diameter of the inner tubes 908 of the upper group 910 is greater than the internal diameter of the inner tubes 908 of the lower group 912. As a result, hydrogen sulphide issuing from each outer tube 908 of the upper group 910 is able to mix with proportionately more commercially pure oxygen than the hydrogen sulphide issuing from the outer tubes 908 of the lower group 912. A higher temperature inner flame stage 1004 is therefore able to be produced than in operation of the burner shown in FIG. 8. Average temperatures in excess of 2000° C. are readily able to be created in the inner stage 1004 without exceeding an inner stage average temperature of 1650° C.

It should be noted that in such terms as "110x/300" used herein the symbol "/" is a division sign.

What is claimed is:

1. Apparatus for the partial oxidation of hydrogen sulphide comprising a furnace and an air-oxygen hydrogen sulphide burner that fires into the furnace, wherein the burner comprises a main passage for combustion-supporting gas containing air, a multiplicity of spaced apart outer elongate fluid-conducting open ended tubes extending in parallel with each other along the main passage, each of the outlet tubes surrounding at least at the distal end of the burner a respective inner elongate fluid-conducting open ended tube, the inner tubes extending in parallel with one another, a first inlet to the burner for oxygen or oxygen-enriched air, and a second inlet to the burner for feed gas containing hydrogen sulphide, the first inlet communicating with the inner tubes, and the second inlets communicating with the outer tubes, wherein the outlets of the inner and outer tubes are so disposed that, in operation, essentially all mixing of hydrogen sulphide with oxygen and air takes place downstream of the distal end of the burner and wherein the outlets of the inner and outer tubes are also so juxtaposed and dimensioned as to enable there to be maintained in the furnace, in operation, a stable flame with at least one first high temperature first stage and at least one second lower temperature stage, the first stage being more remote than the second stage from a chosen area of the inner wall or walls of the furnace, the chosen area thereby being shielded from the first stage by the second stage, and the tubes are arranged in two groups, there being a first group of inner and outer tubes which in operation feed the first stage of the flame, and a second group of inner and outer tubes which in operation feed the second stage of the flame, the inner tubes in the first group being of greater internal diameter than the inner tubes in the second group.

2. The apparatus as claimed in claim 1, wherein the outlets of the outer tubes in the first group are spaced wider apart than the outlets of the outer tubes in the second group.

3. The apparatus as claimed in claim 1, in which there are at least twice as many tubes in the first group than the second group.

4. The apparatus as claimed in claim 1, wherein the tubes in the first group that communicate with the second inlet are of the same internal diameter as the tubes in the second group that communicate with the second inlet.

5. The apparatus as claimed in claim 1, wherein the burner fires generally along the longitudinal axis of the furnace and the second group of inner and outer tubes surround all the tubes in the first group.

6. The apparatus as claimed in claim 1, wherein the burner has a tangential position relative to the furnace and the outlets of the first group of inner and outer tubes are positioned above the outlets of the second group.

7. The apparatus as claimed in claim 1, in which there are two second inlets, one able to be placed in communication with a first source of gas containing hydrogen sulphide and the other communicating with a second source of gas containing hydrogen sulphide, the arrangement being such that the first group of inner and outer tubes communicates, in operation, with the first source, and the second group communicates with the second source.

8. The apparatus as claimed in claim 1, in which there are from 6 to 30 first tubes.

9. The apparatus as claimed in claim 1, in which the inner tubes and outer tubes all terminate in a common plane normal to the axis of the burner.

10. The apparatus as claimed in claim 1, in which the main air passage is defined by a port through which the burner fires into the furnace.

11. The apparatus as claimed in claim 1, in which the burner is arranged such that, in operation, flow of the combustion supporting gas containing air is sufficient to provide adequate cooling for the burner.

12. The apparatus as claimed in claim 1 wherein the first stage of the flame receives oxygen molecules at a flow rate equal to or greater than $(110x/300+y+z)m^3s^{-1}$, where:

- x is the stoichiometric flow rate of oxygen molecules required for complete oxidation of the hydrogen sulphide entering the first stage:
- y is the stoichiometric flow rate of oxygen molecules required for complete oxidation of any ammonia entering the first stage:
- z is the stoichiometric flow rate of oxygen molecules required for complete oxidation of any hydrocarbons entering the first stages.

13. A burner for use in an apparatus as claimed in claim 1, a main passage for combustion-supporting gas containing air, a multiplicity of spaced apart outer elongate fluid-conducting open ended tubes extending in parallel with each other along the main passage, each of the outlet tubes surrounding at least at the distal end of the burner a respective inner elongate fluid-conducting open ended tube, the inner tubes extending in parallel with one another, a first inlet to the burner for oxygen or oxygen-enriched air, and a second inlet to the burner for feed gas containing hydrogen sulphide, the first inlet communicating with the outer tubes, and the second inlet communicating with the inner tubes, wherein the outlets of the inner and outer tubes are so disposed that, in operation, essentially all mixing of hydrogen sulphide with oxygen and air takes place downstream of the distal end of the burner and wherein the outlets of the inner and outer tubes are also so juxtaposed and dimensioned as to enable there to be maintained in the furnace, in operation, a stable flame with at least one first high temperature stage, and at least one second lower temperature stage; and the said tubes are arranged in two groups, there being a first group of inner and outer tubes which in operation feed the first stage of the flame, and a second group of inner and outer tubes which in operation feed the second stage of the flame, the inner tubes in the first group being of greater internal diameter than the inner tubes in the second group.

* * * * *